United States Patent [19]
Easley

[11] Patent Number: 5,509,096
[45] Date of Patent: Apr. 16, 1996

[54] RECEPTACLE AND PLUG FIBER OPTIC CONNECTOR ASSEMBLY

[75] Inventor: James C. Easley, St. Charles, Mo.

[73] Assignee: Syntec Inc., Winfield, Mo.

[21] Appl. No.: 331,380

[22] Filed: Oct. 28, 1994

[51] Int. Cl.⁶ .................................................. G02B 6/36
[52] U.S. Cl. ............................. 385/89; 385/88; 385/19; 606/16
[58] Field of Search ............................ 385/88, 89, 92, 385/76, 77, 78, 16, 19, 25, 117, 49; 362/32; 606/11, 13, 17, 16; 128/4, 6

[56] References Cited

U.S. PATENT DOCUMENTS

| | | | |
|---|---|---|---|
| 4,356,534 | 10/1982 | Hattori | 362/32 |
| 4,428,029 | 1/1984 | Baliozian | 362/32 X |
| 4,557,554 | 12/1985 | Blanc | 385/136 X |
| 4,738,506 | 4/1988 | Abendschein et al. | 385/25 X |
| 4,747,648 | 5/1988 | Gilliland, III | 362/32 |
| 5,116,329 | 5/1992 | Vannus et al. | 606/11 |
| 5,400,428 | 3/1995 | Grace | 385/115 |

Primary Examiner—Rodney B. Bovernick
Assistant Examiner—Hemang Sanghavi
Attorney, Agent, or Firm—Polster, Lieder, Woodruff & Lucchesi

[57] ABSTRACT

A receptacle and plug assembly for connecting a plurality of optical fibers to a single light source. The receptacle contains a plurality of individual sockets. The receptacle is generally cylindrical and the sockets are generally pie shaped and arranged within the receptacle about a focal point. The light is focused on the focal point. Each socket has a spring biased shutter that remains in the closed position when not in use. Each plug is configured to fit into any one of the sockets and to open the shutter when introduced into the socket. The receptacle has guides between the individual sockets to facilitate introduction of the plug. Each plug has an axial bore containing one end of an optical fiber. When a plug is inserted into a socket, the end of the optical fiber is positioned at the focal point and exposed to the light. When more than one plug is inserted in the receptacle the light effectively illuminates all of the fibers simultaneously.

15 Claims, 4 Drawing Sheets

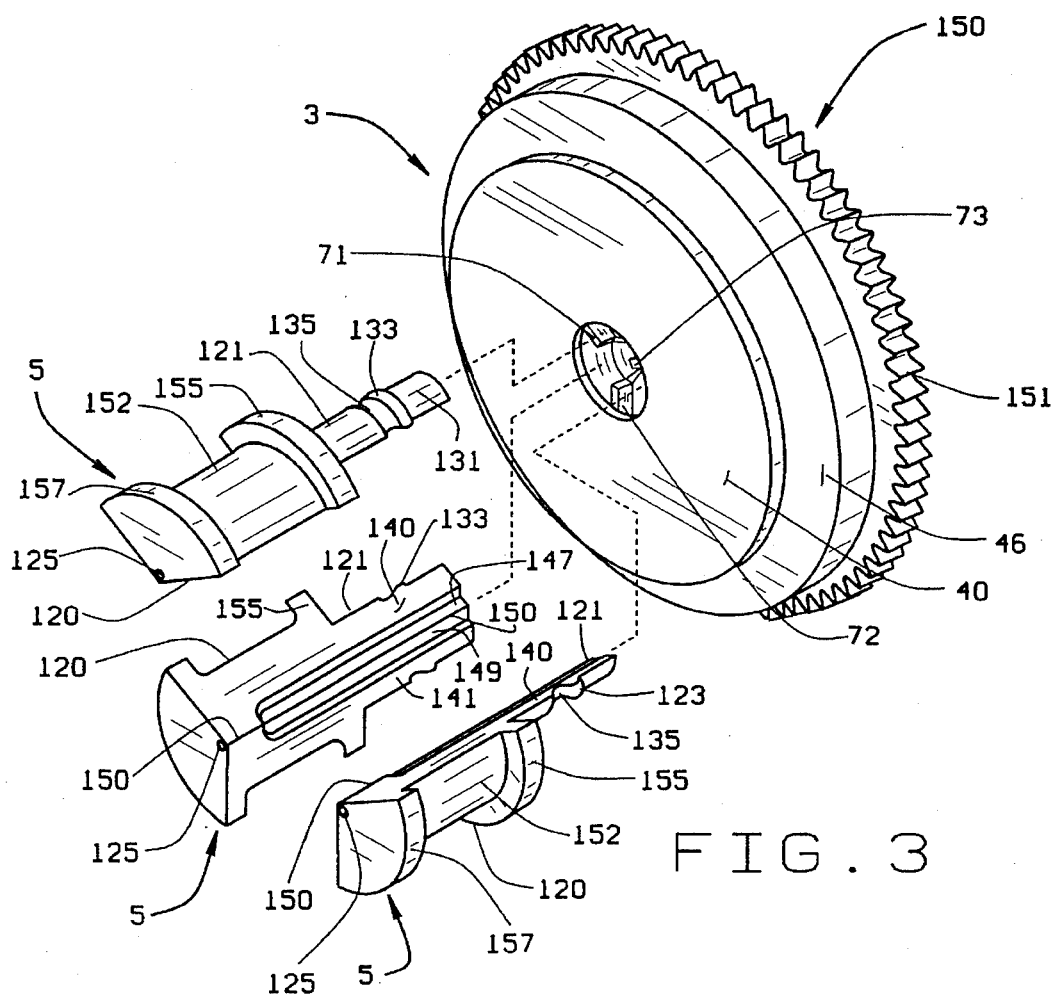
FIG. 3
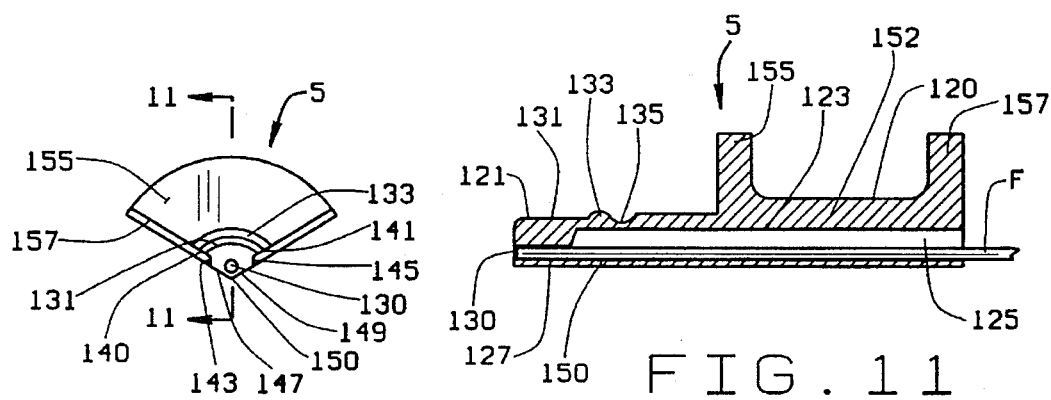
FIG. 10
FIG. 11

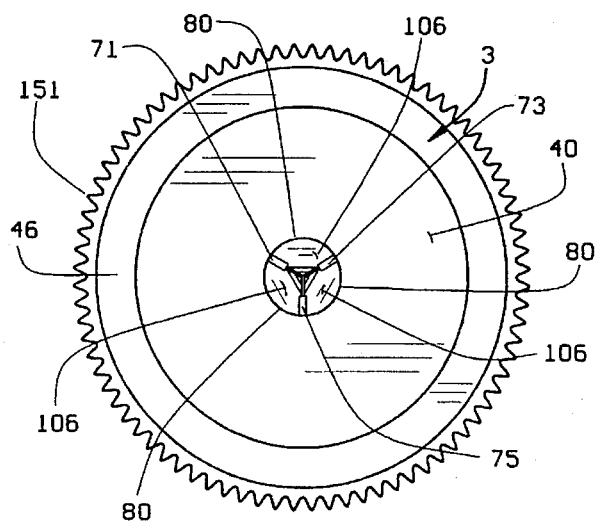
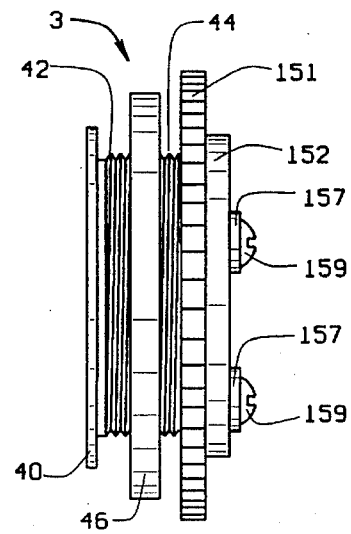
FIG. 4   FIG. 5
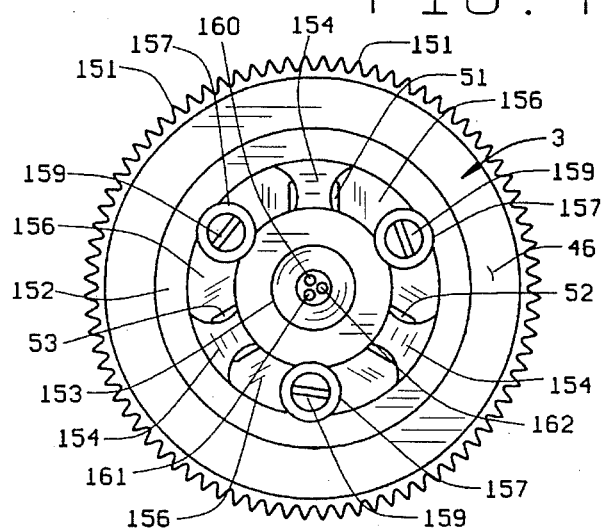
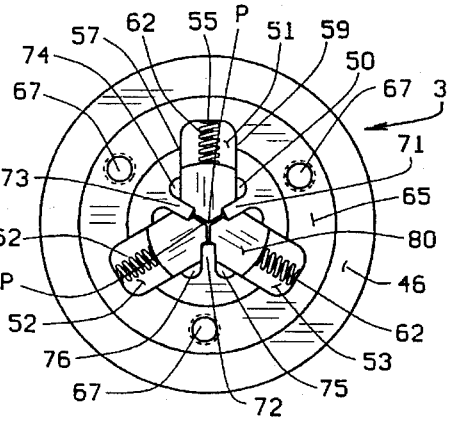
FIG. 6   FIG. 7
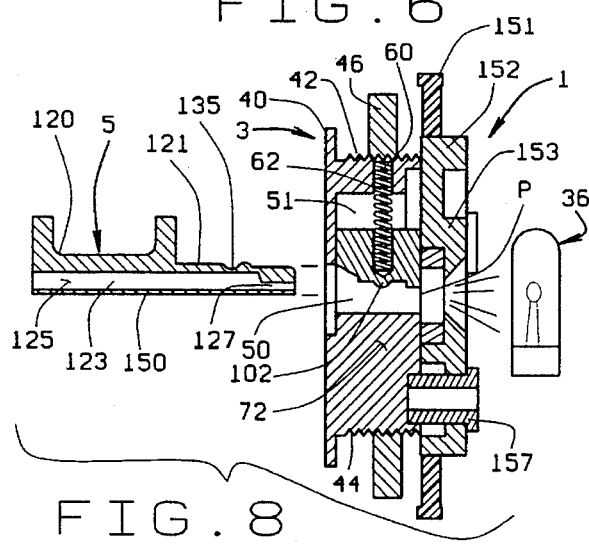
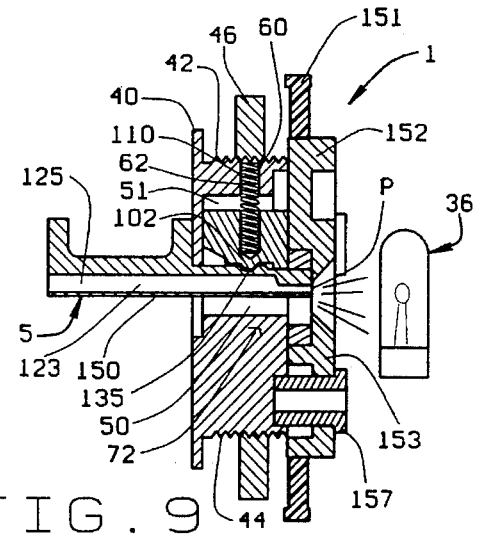
FIG. 8   FIG. 9

5,509,096

RECEPTACLE AND PLUG FIBER OPTIC CONNECTOR ASSEMBLY

BACKGROUND OF THE INVENTION

This application relates generally to microsurgical systems and equipment used in ophthalmological surgery, more particularly, to a shuttered receptacle and plug assembly for the connection of a one or more fiber optic fibers to a single light source of a microsurgical system.

Microsurgical systems for use in ophthalmic surgery typically include one or more hand held instruments connected to and controlled by a control console. The hand held instruments include vitreous cutting and aspiration probes and suction cannulas such as the pneumatic vitrectomy device disclosed in the pending application Ser. No. 08/241,749, filed May 12, 1994, the disclosure of which is hereby incorporated by reference. The control console also contains a vacuum source for providing suction to the vitrectomy probe. Our pending application Ser. No. 08/255,659, filed Jun. 8, 1994 discloses a cassette and a vacuum aspiration collection system containing the cassette, the disclosure of which is hereby incorporated by reference.

In many types of opthalmological surgery a source of light is required. The light source is used to illuminate the surgical field. In ophthalmological surgery, particularly retinal surgery, the surgical field is inside the eye. External light sources tend to cause reflections from the cornea of the eye thus distorting the surgical field. Furthermore, when an external light source is used, the aperture available for penetration of the light into the surgical field is limited by the pupil of the eye. For these reasons, it is a common practice to use a fiber optic instrument to deliver light to the inside of the eye. By use of fiber optic instruments, corneal reflections and/or burns are substantially eliminated and the light my be pointed in any desirable direction.

Fiber optic instruments have been developed such that the instrument delivering the light casts the light directly on the surgical site. Sometimes it has been found desirable to combine the fiber optic instrument with another instrument. For example, the optical fiber can be combined with an intraocular scissors. Such combinations allow the surgeon to use both hands to manipulate the tissues instead of one hand to manipulate tissues and the other to direct the light. These multi-function instruments generally use a smaller optical fiber connected to a light source. Obviously it is an advantage to have the fiber optic light source contained in the same control console that drives the vitrectomy probe or other suction instrument.

Often the surgeon requires the use of more than one instrument. For example, the surgeon may use a suction forceps and an intraocular scissors at the same time. Likewise, the surgeon may employ a vitrectomy probe as well as a non-expandable gas delivery cannula when performing a pneumatic vitrectomy procedure. In these situations, it may be desirable to have an independent optic fiber for each instrument so that the surgeon can direct light to a particular area within the surgical site subject to the application of the particular instrument.

Furthermore, most light sources available for illumination of the optical fibers have a focal point that is much larger that the largest optical fiber in use. Consequently, the output of the fibers is directly proportional to the cross sectional area of the fiber. In other words, in a fiber having a diameter of 0.03 inch, the light output will be 2.25 times the output of a fiber having a diameter of 0.02 inch. Moreover, developments have enhanced the intensity of the white light used to illuminate optical fibers. Consequently, it becomes more important to have the ability to adjust the intensity of the light by dimming the light without distortion of the light. An apparatus for dimming the light provided by the optical fiber without affecting the light source is the subject matter of the co-pending parent application Ser. No. 08/255,660. It would be advantageous, therefore, to provide a white light dimmer for a single white light source incorporated in an ophthalmological surgery system that simultaneously accommodates multiple optic fibers.

SUMMARY OF THE INVENTION

It is, therefore, among the principal objects of the present invention to provide a receptacle and plug assembly for the connection of more than one optical fibers to a single white light source at the same time.

It is another object of the present invention to provide such a receptacle and plug assembly having a receptacle containing multiple shuttered sockets that will accommodate one or more optical fibers at the same time.

It is still another object of the present invention to provide such an assembly having plugs bearing the optical fibers, the plugs being configured to slide into any one of the multiple sockets and simultaneously open the shutter.

Another object of the invention is to provide such an assembly in which the receptacle has plug guides to insure proper insertion of the plugs into the sockets.

Yet another object of the present invention is to provide such an assembly in which the shutters that remain closed block light emission from the unoccupied sockets.

Another object of the present invention is to provide such an assembly in which the plugs can accommodate optical fibers of varying diameters.

Still another object of the present invention is to provide such an assembly that can be used with a surgical system control console containing at least one white light source.

Yet another object of the invention is to provide such an assembly that can be used with a white light dimmer to control the amount of light emitted through each of the multiple optical fibers attached to the white light source.

Another object of the present invention is to provide a receptacle and plug assembly for the attachment of multiple optic fibers to a white light source at the same time that is simple and economical to manufacture, constructed from lightweight materials, easy to use in the surgical theater, and well suited for its intended purposes.

In accordance with the invention, generally stated a receptacle and plug assembly for connecting a plurality of optical fibers to a single white light source is provided having a receptacle containing a plurality of individual sockets and a plurality of removable plugs bearing the optical fibers. The receptacle preferably is cylindrical and the individual sockets are generally pie shaped and arranged within the receptacle about a center point. The light from a white light source is focused on the back side of the center point. Each socket has a spring-biased shutter that remains in a closed position when not in use. Each plug is configured to fit into any one of the sockets. The receptacle has guides between the individual sockets to facilitate introduction of the plug into the socket. The plugs are configured to open the shutter upon insertion into the socket and to snap lock into place. Each plug has an axial bore containing one end of an optical fiber. The bores can vary in size to accommodate various diameters of optic fibers. When a plug is inserted into the socket, the end of the optical fiber is exposed to the white light. When more than one plug is inserted in the receptacle, the fibers converge at a focal point and the white light effectively illuminates all of the fibers. A white light dimmer can be employed to limit the illumination through one or all of the attached optic fibers.

BRIEF DESCRIPTION OF THE DRAWINGS

FIG. 3 is another enlarged isometric view, partially disassembled, of the optical fiber connector assembly of the present invention;

FIG. 4 is a front elevational view of the receptacle of the optical fiber connector assembly of the present invention;

FIG. 5 is a side elevational view thereof;

FIG. 6 is a rear elevational view thereof;

FIG. 7 is a front elevational view of the shutter assembly of the optical fiber connector assembly of the present invention;

FIG. 8 is a side elevational view, shown in cross section, of the receptacle and plug assembly of the present invention;

FIG. 9 is another side elevational view, shown in cross section, of the receptacle and plug assembly the present invention with one plug inserted in the receptacle;

FIG. 10 is an end plan of one plug;

FIG. 11 is a cross sectional view thereof taken along lines 11—11 of FIG. 10;

DESCRIPTION OF THE PREFERRED EMBODIMENT

Figure 1:
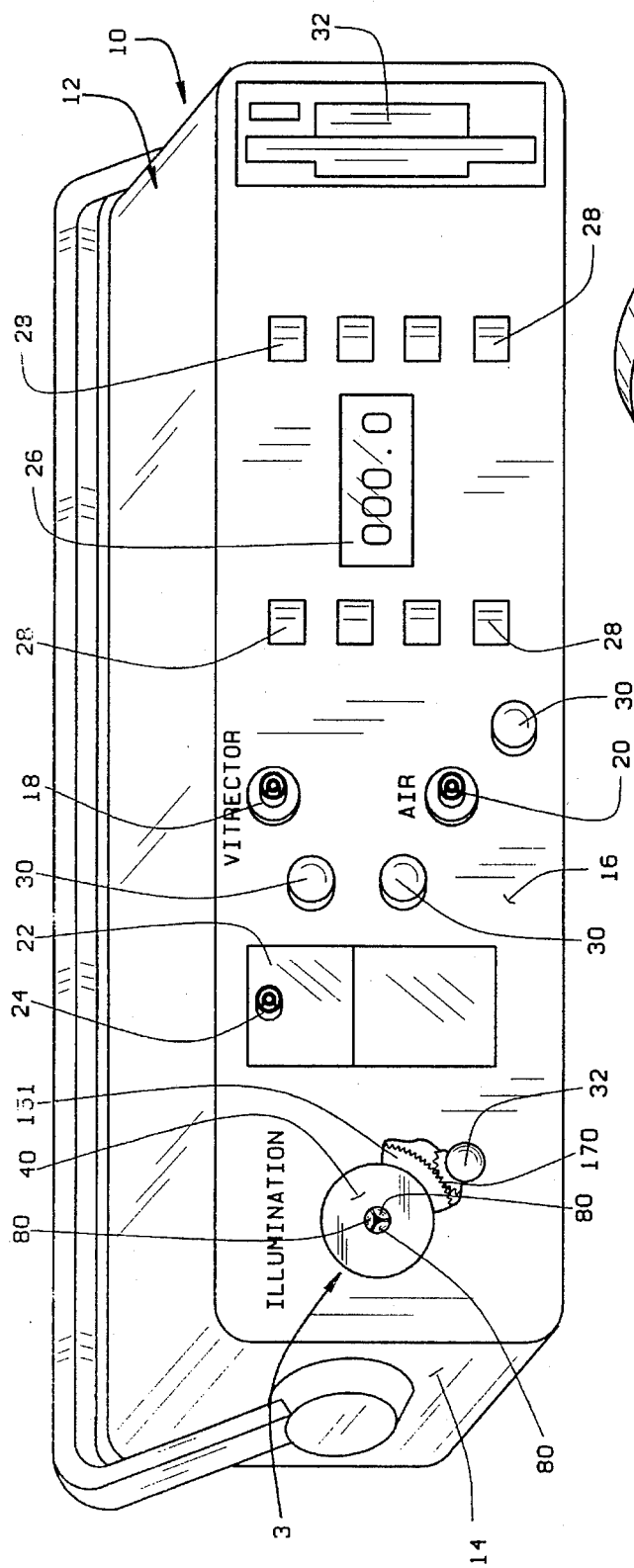
FIG. 1 is an isometric view, partially cut away, of a surgical system employing the optical fiber connector receptacle of the present invention.

The optic fiber connector assembly of the present invention is indicated generally by reference numeral 1 in the drawings. The assembly contains a receptacle 3 and a plurality of individual plugs 5. In the illustrated embodiment, receptacle 3 is constructed to accommodate three individual plugs 5. In FIG. 1, the receptacle 3 is shown mounted in a microsurgical system, indicated generally by the reference numeral 10. It will be appreciated, however, that assembly 1 is intended to allow the connection of a plurality of optic fibers F to a single light source and is not limited to the light source contained in a microsurgical system.

The microsurgical system 10 shown includes a control console 12 which is housed in an outer cabinet 14. The cabinet has a front panel 16. The console 12 has a number of couplers for the attachment of surgical instruments. The cabinet has a vitrector coupler 18 and a gas or air coupler 20. A conventional vitrector (not shown) can be attached to the console at coupler 18. The console 12 is programmed to drive the cutting mechanism of the vitrector probe. Suction to the vitrector is provide by a suction system including a vacuum cassette 22 of the type described and claimed in the pending application Ser. No. 08/255,659, filed Jun. 8, 1994, the disclosure of which is hereby incorporated by reference. Cassette 22 has a coupler 24. Furthermore, a needle or cannula (not shown) can be attached, via a tubing or small bore hose (not shown), to coupler 20. The console provides air to the cannula through the coupler 20. A pneumatic vitrectomy probe (not shown) which has suctioning and cutting features as well as a non-expanding gas delivery feature can be attached at the vitrector coupler 18 and air coupler 20 simultaneously. Such a probe is described in application Ser. No. 08/241,749, filed May 12,1994, the disclosure of which is hereby incorporated by reference. The front panel 16 of the console 12 contains a digital display 26 screen and a plurality of membrane pads 28 and knobs 30 to select and control the various functions of the system. The system also employs a foot pedal control (not shown) through which the surgeon can control the operation of the vitrector and suction. A dimmer adjustment knob 32 is positioned adjacent the receptacle 3, and will be described in greater detail below. The console 12 has a computer disk drive 32 for the control of various functions of the system. It will be appreciated by those skilled in the art that any number of designs of the console will accommodate the fiber optic connector assembly of the present invention and that the particular features and functions of the illustrated microsurgical system 10 may vary and do not form a part of the present invention. It is relevant, however, that the microsurgical system incorporate some type of white light source, indicated generally by reference numeral 36 in FIGS. 8 and 9, directing sufficient light to a focal area P to effect illumination of the optical fibers. Again, the design of the particular light source may vary and is not relevant to the present invention.

In the illustrated embodiment, receptacle 3 is attached to the front panel 16 of the console 12. A face plate 40 surrounds the receptacle 3 and abuts the front panel 16. As shown in FIG. 5, the face plate 40 is integrally attached to a housing 42. The housing is generally cylindrical and has external threads 44. A mounting nut 46 having internal threads (not shown) is threadedly engaged around the housing 42. The housing 42 is inserted in an appropriate opening in the console panel 16 and the nut 46 is tightened so that the panel 16 is caught between the face plate 40 and the nut 46. The housing 42 defines an internal bore 50, as shown in FIG. 7. Focal area P is at the rear center axis of bore 50. The housing 42 has three internal shutter seats 51, 52, and 53 in communication with the bore 50. The shutter seats 51–53 are identical and extend parallel to the bore 50 and have a bottom wall and opposed parallel side walls 57 and 59. There is a bias spring bore 60 formed through the housing 42 at each shutter seat bottom wall 55 and in communication with the seat. A shutter bias spring 62 is seated in the bore 60 as will be explained below. The housing 42 has a end wall 65 with threaded holes 67 formed therein at end at equal distances apart.

There are three internal guides 71, 72, 73 that extend into the bore 50 from the housing 42. The guides 71–73 extend axially within the bore 50 from the face plate 40 to the end wall 65. The guides are spaced equidistant about the bore 50. The guides define individual sockets 74, 75 and 76 within the bore 50. As will be appreciated, the sockets are generally triangular or pie shaped in configuration and are positioned within the receptacles 3 about the central axis of bore 50, each socket occupying an angle of approximately 120°. The sockets are thus arranged about the focal area P. The receptacle 3, therefore, is cylindrical in shape. The various elements of the receptacle 3 are fashioned from a light weight, durable metal alloy such as an aluminum alloy. There is a shutter 80 situated within each socket. The shutter 80 is shown in greater detail in FIGS. 12A–12E, and will now be described in detail.

The illustrated embodiment of the connector assembly 1 employs three separate shutters 80. However, each shutter 80 is identical. The shutter 80 has a body 82 with a slightly arcuate top wall 84, flat rear end wall 86 and parallel opposed upper side walls 88, 89. Each side wall 88, 89 adjoins an inwardly angled lower side wall 90, 91 respectively. Lower side walls 90, 91 adjoin short parallel walls 93, 94. A flat bottom wall 98 extend between walls 93 and 94. There is a depending point 100 at the rear end. A detent knob 102 is formed on the lower wall 98 of the shutter 80, approximately at the mid-point. The front wall or face 106 of the shutter has a generally concave configuration. The face tapers inwardly toward the lower wall 98. The concave taper acts as a ramp to position a plug inserted in a socket as will be described below. There is a bore 108 formed through the top wall 80 into the body 82 of the shutter 80. The bias spring 62 is seated in the previously described bores 60 and in the bore 108.

FIG. 7 shows the relationship of three shutters 80 to the sockets 51–53. The bias springs 62 urge the shutter 80 downward until the short inwardly angled walls 90, 91 abut the guides 71, 72 and 73. The points 100 converge forming a generally light impervious seal. As shown in FIG. 4, when shutters 80 are in place and closed, the front of the receptacle 3 presents as a integral unit having a generally concave central segment comprised of the respective shutter face walls 106 defined by the respective guides 71–73. The individual shutters are opened upon insertion of a plug 5 of the assembly which will now be described in greater detail.

Figure 2:
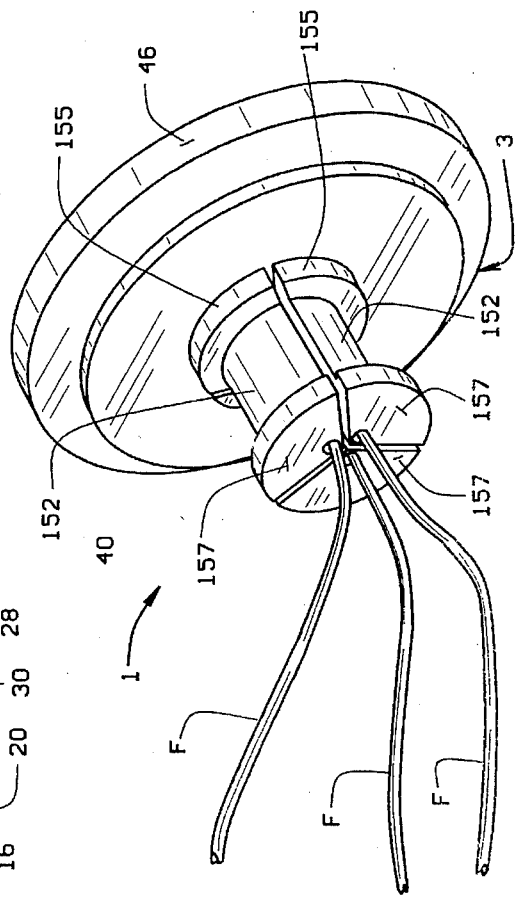
FIG. 2 is an enlarged isometric view of the optical fiber connector assembly of the present invention.
Figure 12A:
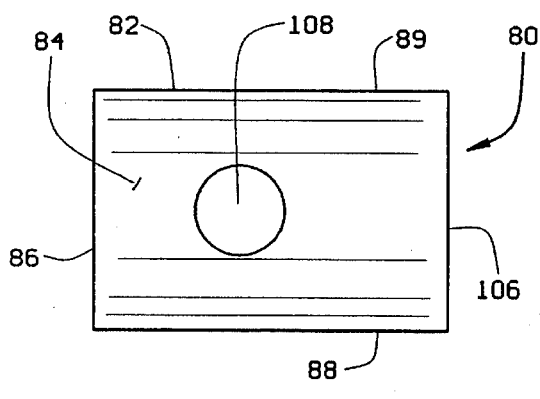
FIG. 12A is an enlarged top plan of a shutter.
Figure 12B:
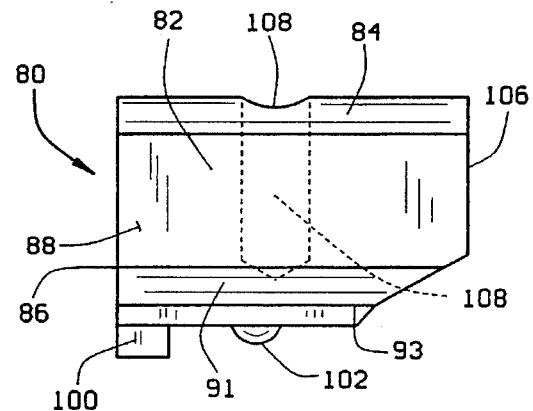
FIG. 12B is an enlarged side elevational view of a shutter.
Figure 12C:
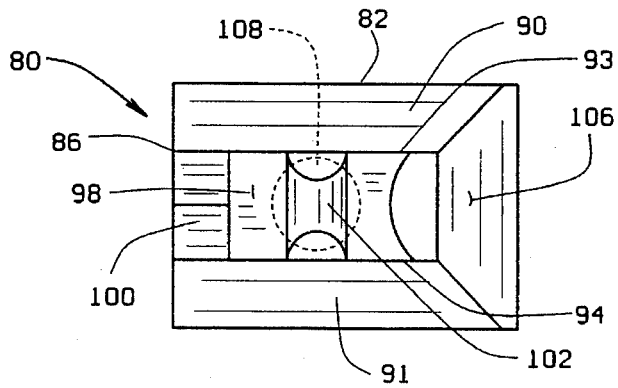
FIG. 12C is an enlarged bottom plan of a shutter.
Figure 12D:
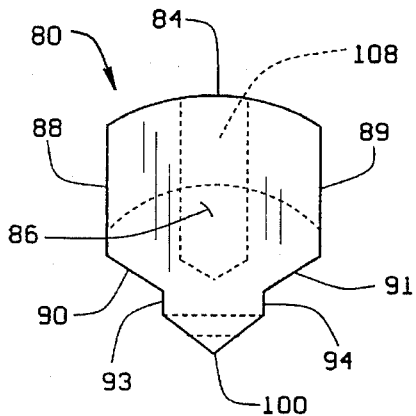
FIG. 12D is an enlarged rear elevational view of a shutter.
Figure 12E:
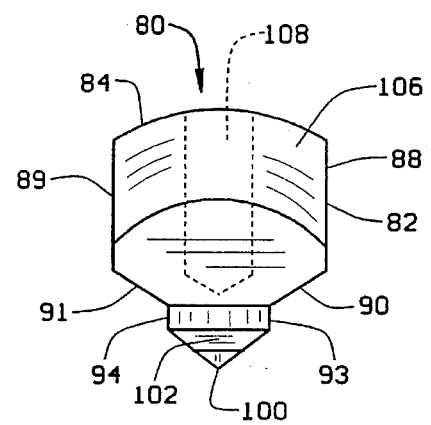
FIG. 12E is a front elevational view thereof.

A plug 5 of the present invention is shown in greater detail in FIGS. 10 and 11. Each plug has a triangular cross section of approximately 120°, complementary in shape to the sockets 74–76. Each plug 5 has a handle section 120 and a tine section 121. Plugs 5 are fashioned from a light weight, durable alloy such as an aluminum alloy. The length of the tine section 121 is approximately that of the bore 50 in the receptacle 3. There is an axial bore 123 formed through the plug. The bore has a first section 125 of a selected diameter and a second section 127 of a selected diameter. The center lines of the respective bore sections are offset. The second section is disposed to secure an end of a fiber optic fiber F as shown in FIG. 11. The size of the second bore section 127 may vary depending upon the diameter of the optic fiber. The second bore section 127 terminates in an orifice 130. The tine section 121 has a generally arcuate top wall 13 1. A raised rib 133 is formed transversely across the top wall 131. There is a transverse retention groove 135 formed across the top wall 131 adjacent the rib 133. The groove 135 is disposed to accept the detent knob 102 of the shutter 80 as will be explained below. The plug 5 has a first inwardly angled side wall 140 and a second inwardly angled side wall 141. These angled side walls adjoin very short parallel side walls 143 and 145 respectively which in turn adjoin short inwardly angled side walls 147 and 149. The short walls 147 and 149 define a ridge 150 which runs the length of the underside of plug 5. The handle section 120 of the plug 50 has an arcuate wall 152 of substantially greater material thickness than that of the tine. There is a first arcuate raised rib 155 adjacent the tine and a second arcuate raised rib 157 adjacent the end of the handle section. The raised ribs 155 and 157 are, basically, knob sections that facilitate the insertion or removal of a plug 5 from the receptacle 3. The user can grasp the plug 5 between the respective ribs. When three plugs 5 are inserted in the receptacle 3, as shown in FIG. 2, the first raised ribs 155 abut the face plate 40 and the second raised ribs 157 cooperate to form a circular knob.

The relationship of a plug 5 to the receptacle 3 is shown in greater detail in FIGS. 8 and 9. When a socket is empty, as shown in FIG. 8. The bias spring 62 urges the shutter 80 downward until it abuts the guides (see FIG. 7). Appropriate light from the conventional light source 36 is concentrated at focal area P at the rear end of the bore 50 of the housing 42. The point 100 completely blocks light L from the light source 36 and prevents the light from shining through the socket. As a plug 5 is introduced into a socket for example socket 75, the tine 121 exerts pressure against the concave, taper face 106 of the shutter 80, which functions as a camming means for translating linear force into an upward force. The face 106 slides against the tine 121 as the shutter rises. The concave taper allows the tine 121 to exert upward as well as linear force against the shutter to urge the shutter 80 against the bias spring 62. The guides for example guides 71 and 72 correctly position the tine 121 in the socket. The tine 121 slides into the socket until rib 15 5 abuts the face plate 40. Simultaneously, the shutter 80 is urged against the top wall 121 tine. Knob 102 seats in groove 135 while the rib 133 engages the backside of the knob 102. The plug 5 is secured in the socket 75 with a snap-lock arrangement between the shutter 80 and the plug 5. Thus, the shutter 80 functions not only as a shutter to block light through the socket but also as a spring biased locking means for retaining a plug 5 in the receptacle 3. It will be appreciated that the orifice 130 in the tine 121 is exposed to light L focused on the backside of bore 30 at area P. The light contacts the optical fiber F in the plug 5 and is transmitted along the fiber F to an appropriate instrument (not shown). If only one plug 5 is inserted, the two other shutters 80 remain closed. If a second plug 5 is inserted, the orifice 130 of that plug is positioned in the focal area P and the single light L contacts two optical fibers F. Likewise, if the third plug 5 is introduced, the single light illuminates all three optical fibers.

In FIGS. 4–9 the receptacle 5 is illustrated in conjunction with a white light dimmer assembly 150. The dimmer assembly 150 has a spur gear 151. The gear is connected to a circular disc carriage 152 which in turn is connected to a central disc or cover 153 by a plurality of struts 154. There are arcuate slots 156 between the struts 154. Bushings 157 are inserted through the slots 156 and secured to the receptacle 3 with screws 159 which engage the holes 67 in the rear wall 65. The spur gear 151 rotates against the back of the receptacle 3. The disc 153 functions as the cover, as disclosed in FIGS. 7 and 8 of the application Ser. No. 08/235, 660, hereby incorporated by reference. There are three openings 160, 161 and 162 formed in the disc 153. The openings 160–162 are positioned so that one opening will align with an orifice 130 in the end of atine 121 when the disc 153 is appropriately positioned. The rims of the openings 160–162 are thin edges. As the disc 153 is rotated over the ends of the plugs 5, via the gear 151, the thin edges will begin to cover the orifices 130 as well as the ends of the optic fibers F and effectively reduce the amount of light carried by the fiber F. As best seen in FIG. 1, the gear 151 is in intermeshing contact with a small gear 170 within the console 12. The gear 170 is operatively attached to the external rotatable knob 32. The surgeon or assistant can rotate the knob 132 and thus dim the light.

It will be apparent that various changes and modifications may be made in the invention without departing from the scope of the appended claims. For example, a receptacle containing more than three sockets can be used to provide illumination to more than three optic fibers. The recepticale can be constructed in a configuration other than cylindrical, for example square. Furthermore, it is not essential that the connector include a white light dimmer. Therefore, the foregoing description and accompanying drawings should be viewed as illustrative only and not in a limiting sense.

What is claimed:

1. An apparatus for the attachment of a plurality of optical fibers to a light source adapted to direct light toward a focal area, comprising:

a receptacle having a plurality of individual sockets positioned in the focal area;

spring biased, tapered shutter means in each of said sockets for closing said socket when not in use;

a plurality of individual plugs, each of said plugs configured with a handle and a tine to fit in any one of said plurality of sockets and open said shutter means when introduced therein, each of said plugs having an axial bore with an end of an optical fiber affixed therein;

said plugs, when introduced into said sockets, being configured to engage and actuate said shutter means and to position the end of the optical fiber at the focal area and expose the end of the fiber to the light source.

2. The apparatus of claim 1 wherein said sockets are generally triangular in shape.

3. The apparatus of claim 2 having three sockets.

4. The apparatus of claim 3 wherein the light source is a single light source.

5. The apparatus of claim 1 wherein said spring biased shutter means comprises a shutter which can be moved from a first position in which the socket is blocked by the shutter to a second position in which the shutter is raised against the bias spring, said shutter being moveable from said first position to said second position by an introduction of one of said plugs.

6. The apparatus of claim 5 wherein said shutter further comprises a concave front wall having a taper to a bottom wall, said front wall disposed to function as a camming means to translate a horizontal force created by forcing said plug against said shutter into a vertical force for urging said shutter against said bias spring.

7. The apparatus of claim 1 further including guide means adjacent said sockets for positioning said plugs within said sockets.

8. The apparatus of claim 1 further comprising a white light dimmer.

9. A connector for connecting a plurality of optical fibers to a microsurgical console containing a light source, comprising:

a receptacle having plurality of individual sockets disposed about a central axis of said receptacle, said sockets defining a focal area for the light source;

a spring biased shutter in each of said sockets, each said shutter having a front wall with a concave taper configuration and a bottom wall with a detent knob formed thereon;

a plurality of optical fiber plugs, each said plug having a handle section and a tine section and an axial bore formed through each section containing an end of an optical fiber, said tine section having a retention groove formed on an upper surface thereof;

said tine section disposed to engage said front wall of said shutter and urge said shutter open upon an introduction of said plug into said socket.

10. The connector of claim 9 wherein said shutter is movable from a closed position to an open position by said introduction of said plug into said socket.

11. The connector of claim 9 wherein said detent knob is disposed to engage said retention groove upon said introduction of said plug into said socket and thereby releasably secure said plug in said socket.

12. The connector of claim 9 wherein each said end of said optical fiber is positioned at said focal area upon said introduction of said plug into said socket.

13. The connector of claim 9 wherein said receptacle is substantially cylindrical and each said socket is substantially triangular in configuration.

14. The connector of claim 9 having three said sockets and three said plugs.

15. The connector of claim 9 wherein said receptacle and each said plug are constructed from a lightweight alloy.

* * * * *